United States Patent
Brunson et al.

(10) Patent No.: US 8,032,624 B2
(45) Date of Patent: Oct. 4, 2011

(54) PLUGGABLE CONTACT RESOLUTION

(75) Inventors: Gordon R. Brunson, Broomfield, CO (US); Tibor Lukac, Freehold, NJ (US); Chandra Ravipati, Thornton, CO (US)

(73) Assignee: Avaya Inc., Basking Ridge, NJ (US)

( * ) Notice: Subject to any disclaimer, the term of this patent is extended or adjusted under 35 U.S.C. 154(b) by 98 days.

(21) Appl. No.: 12/488,277

(22) Filed: Jun. 19, 2009

(65) Prior Publication Data

US 2010/0325249 A1    Dec. 23, 2010

(51) Int. Cl.
  *G06F 15/173* (2006.01)
(52) U.S. Cl. ......... 709/223; 709/203; 709/219; 709/224
(58) Field of Classification Search .................. 709/223, 709/224, 203, 217, 219
  See application file for complete search history.

(56) References Cited

U.S. PATENT DOCUMENTS

| | | | |
|---|---|---|---|
| 753,915 A | 5/1909 | Collins | |
| 7,412,490 B2 * | 8/2008 | Matsa et al. | 709/206 |
| 7,721,277 B1 * | 5/2010 | Thyagarajan et al. | 717/166 |
| 2004/0088424 A1 | 5/2004 | Park et al. | |
| 2005/0044127 A1 | 2/2005 | Jaiswal et al. | |
| 2007/0201459 A1 | 8/2007 | Bao et al. | |
| 2008/0101335 A1 | 5/2008 | Badger | |
| 2008/0222118 A1 * | 9/2008 | Scian et al. | 707/3 |
| 2009/0013062 A1 | 1/2009 | Blatherwick et al. | |
| 2009/0154452 A1 | 6/2009 | Ku et al. | |
| 2010/0287131 A1 * | 11/2010 | Church | 706/47 |

FOREIGN PATENT DOCUMENTS

| | | |
|---|---|---|
| EP | 1675353 | 6/2006 |
| EP | 1759522 | 3/2007 |
| EP | 2026550 | 2/2009 |
| WO | WO 2005/122544 | 12/2005 |
| WO | WO 2009/018418 | 2/2009 |

OTHER PUBLICATIONS

"3rd Generation Partnership Project; Technical Specification Group Core Network; IP Multimedia (IM) session handling; IM call model; Stage 2 (Release 7)," Global Systems for Mobile Communication, 3GPP TS 23.218, V7.4.0, Dec. 2006, pp. 1-59.
Lennox et al., "Call Processing Language (CPL): A Language for User Control of Internet Telephony Services," RFC 3880, IETF Standard, Internet Engineering Task Force, Oct. 2004, pp. 1-74.
Drage, "A Session Initiation Protocol (SIP) Extension for the Identification of Services," Internet Engineering Task Force (IETF), Internet Society, Mar. 2009, pp. 1-28.
Extended European Search Report for European Patent Application No. 10158284.9, dated Jun. 15, 2010.
U.S. Appl. No. 12/241,368, filed Sep. 30, 2008, Brunson et al.

(Continued)

*Primary Examiner* — Lashonda Jacobs
(74) *Attorney, Agent, or Firm* — Sheridan Ross P.C.

(57) ABSTRACT

Methods, devices, and systems are provided for taking a pluggable extension and applying it to a unique set of a user population to handle their preferred and user-centric alerting relationships. More particularly, the pluggable extension allows a user to have their personalized contact resolution algorithm applied by a server to calls initiated by them or directed toward. The contact resolution algorithm is pluggable to any server and does not need to be built into the server itself. Moreover, multiple users can refer to and use the same pluggable contact resolution algorithm.

20 Claims, 3 Drawing Sheets

OTHER PUBLICATIONS

Farha, Ramy, "SIP Traffic Load Balancing", University of Toronto, School of Electrical and Computer Engineering, available at http://individual.utoronto.ca/rfarha/My_Publications/IASTED_2003.pdf, 6 pages.

Official Action for German Patent Application No. 102008062983.9-31, dated Aug. 17, 2009.

European Search Report for Great Britain Application No. 0823698.6, dated Apr. 21, 2009.

* cited by examiner

PLUGGABLE CONTACT RESOLUTION

FIELD OF THE INVENTION

The invention relates generally to communications and more specifically to portable user-centric contact resolution mechanisms.

BACKGROUND

Session Initiation Protocol (SIP) is an open signaling protocol for establishing many kinds of real-time communication sessions. Examples of the types of communication sessions that may be established using SIP include voice, video, and/or instant messaging. These communication sessions may be carried out on any type of communication device such as a personal computer, laptop computer, Personal Digital One key feature of SIP is its ability to use an end-user's Address of Record (AOR) as a single unifying public address for all communications. Thus, in a world of SIP-enhanced communications, a user's AOR becomes their single address that links the user to all of the communication devices associated with the user. Using this AOR, a caller can reach any one of the user's communication devices, also referred to as User Agents (UAs) without having to know each of the unique device addresses or phone numbers.

One of several steps that are performed during the establishment of a SIP session is contact resolution which determines which devices registered to a given user will alert on any given call. In traditional systems, contact resolution policies (decisions made regarding what device to ring, how to ring it, etc.) for a user were built into the PBX and operated only for provisioned telephone sets. Thus, a user's choices for contact resolution policies were PBX release and telephone device specific. This is not very desirable in SIP since the underlying IP network becomes a general purpose attachment mechanism for any number of SIP communications devices registered by the user. It is the SIP user who decides which of his or her devices are registered, attached, enabled, and to what purpose each of these devices will be used. In SIP, contact resolution is conventionally done in the location server, but like a PBX, it is often undesirable to re-deploy the location server to be able to offer new contact resolution behavior. It is therefore desirable for a user to have access to contact resolution policies that can be easily provided on their behalf by systems/network administrators without requiring a modification of the specific PBX or communications feature servers or location servers of the network in general.

SUMMARY

Embodiments of the present invention provide mechanisms which enable contact resolution policies or algorithms for a user and particularly a SIP user. Many enterprises allow SIP users to register their preferences for each device or network element at a location server as a simple q-value. In SIP, the role of a location server is to arbitrate sending a SIP request to each registered contact according to user policy. This is conventionally done by evaluating the q-value within a static algorithm implementing a user policy. Several commonly used policies include sequential forking (contacting each device in turn), parallel forking (contacting all devices at the same time and allowing the device which responds first to win the contact), and load balancing. Embodiments of the present invention allow a network administrator to "hot deploy" a new algorithm choice to the users of the network, and to allow a user to select and optionally personalize any deployed contact resolution policies or algorithms available in the enterprise network. More specifically, embodiments of the present invention provide the mechanisms that allow a user to find and utilize a pluggable contact resolution algorithm (serial forking, parallel forking, smart load balancing, vary rings based on caller identity, etc.) which has been properly deployed in a network. Often times the pluggable contact resolution algorithm is deployed by an administrator or some other user with administrator permissions. However, embodiments of the present invention are not so limited and non-administrative users may also be allowed to develop and deploy pluggable contact resolution algorithms for personal use and/or for use by other users. Any user which elects to employ a pluggable contact resolution algorithm may also be allowed to refine and customize such contact resolution algorithms when adopted.

An extension module containing the contact resolution algorithm is used in connection with a table entry showing which Contact Resolution Algorithm (CRA) to use (i.e., which extension module should be referenced) when an inbound contact is received for that user.

An extension module is like a SIP servlet in that an extension module is a self-contained jar file that can be deployed and undeployed individually. A SIP servlet is very similar to other types of servlets in that they enhance the interface in which they are loaded to support SIP functions. An example of another type of servlet is an http servlet which is a Java application that runs in a web server or application server and provides server-side processing, typically to access a database or perform e-commerce processing. It is a Java-based replacement for CGI scripts, Active Server Pages (ASPs) and proprietary plug-ins written in C and C++. Servlets are similar to the CGI concept but, instead of using a separate process, messages are passed to a class that runs within a virtual machine inside the server.

Many servlets are written in a particular programming language (e.g., Java) which allows them to be portable between servers and operating systems. While Java is one example of a programming language that can be used to create a servlet or an extension module, one skilled in the art will appreciate that embodiments of the present invention are not so limited. More specifically, embodiments of the present invention contemplate the creation of an extension module in any type of programming language which allows the extension module to be portable between servers and/or operating systems. Embodiments of the present invention also contemplate an extension module that is capable of running inside a virtual machine on a server (e.g., an enterprise server and particularly a SIP server).

Unlike SIP servlets, however, extension modules are hot deployable. They allow runtime upgrades with no service loss. In accordance with at least some embodiments of the present invention, an extension module may be used in a SIP dialog adaptation to modify the form of contact resolution a particular user gets when an incoming contact is received. More specifically, individual dialog adaptation logic can be implemented as an extension module rather than as servlets for each adaptor. In addition to the hot swap availability of the extension module, use of the extension module allows easier management and common dialog adaptation logic to be shared. Another difference between an extension module and traditional SIP servlets is that unlike SIP servlets which assume only the SIP servlet interface, an extension module may define many interfaces to expose its services.

Furthermore, and in accordance with at least some embodiments of the present invention, an extension module is used to expose services that can be accessed by servlets, an application router, and/or other SIP applications. In some embodiments, an extension module is bound to a unique short ID defined during deployment (usually defined by a system administrator). The extension module may also define the interface that exposes its services. An extension API may facilitate the retrieval of an extension module, when required, via its short ID. Since extension modules are deployable self-contained jars, configuration information for an extension module is contained in the jar files along with the class files that implement the extension module. Configuration information can be defined in a deployment XML file in the same manner as servlets.

In operation, each remote party is associated with an inbound and outbound dialog adaptation logic implemented as a service host extension module. Any service that requires dialog adaptation (such as contact resolution) will invoke an adaptation module via its extension module identifier (i.e., the unique short ID assigned to the extension module).

This extension module is used in addition to table entry that shows which CRA to use when a contact resolution request is received. In accordance with at least some embodiments of the present invention, the table contains user-related provisioned and dynamic data. Within the table a user may be allowed to define their personal association with a deployed CRA that they want to have applied whenever a contact is received for them. More specifically, the table for a particular user would include the identifier of an extension module that will apply a particular CRA. There may be user centric data associated with this extension that can be configured and re-configured by the user as desired through a separate web interface for setting user options. More specifically, once the user data configuration or re-configuration has occurred in the table, a validation check of the active CRA can occur during registration or re-registration by knowledgeable endpoints.

When a request for contact resolution is received, the extension module is invoked. Thus, the contact resolution is pluggable and does not need to be built into the SIP Location server itself. Moreover, multiple users can reference the same extension module and apply the same or similar CRA with their own personalized user settings.

In accordance with at least some embodiments of the present invention a communication method is provided that generally comprises:

receiving, at a first server, a contact resolution request addressed to a first user;

identifying contact resolution preferences for the first user;

determining that the contact resolution preferences for the first user utilize an extension module as a part of contact resolution; and invoking, by the first server, the extension module applying the user preference options to the extension module for that request.

The term "computer-readable medium" as used herein refers to any tangible storage and/or transmission medium that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

The terms "determine," "calculate" and "compute," and variations thereof, as used herein, are used interchangeably and include any type of methodology, process, mathematical operation or technique.

The term "module", "agent", or "tool" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The preceding is a simplified summary of embodiments of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

DETAILED DESCRIPTION

The invention will be illustrated below in conjunction with an exemplary communication system. Although well suited for use with, e.g., a system using a server(s) and/or database (s), the invention is not limited to use with any particular type of communication system or configuration of system elements. Those skilled in the art will recognize that the disclosed techniques may be used in any communication application in which it is desirable to allow users to personalize their contact resolution algorithms, particularly in a SIP environment.

The exemplary systems and methods of this invention will also be described in relation to analysis software, modules, and associated analysis hardware. However, to avoid unnecessarily obscuring the present invention, the following description omits well-known structures, components and devices that may be shown in block diagram form, are well known, or are otherwise summarized.

For purposes of explanation, numerous details are set forth in order to provide a thorough understanding of the present invention. It should be appreciated, however, that the present invention may be practiced in a variety of ways beyond the specific details set forth herein.

Figure 1:
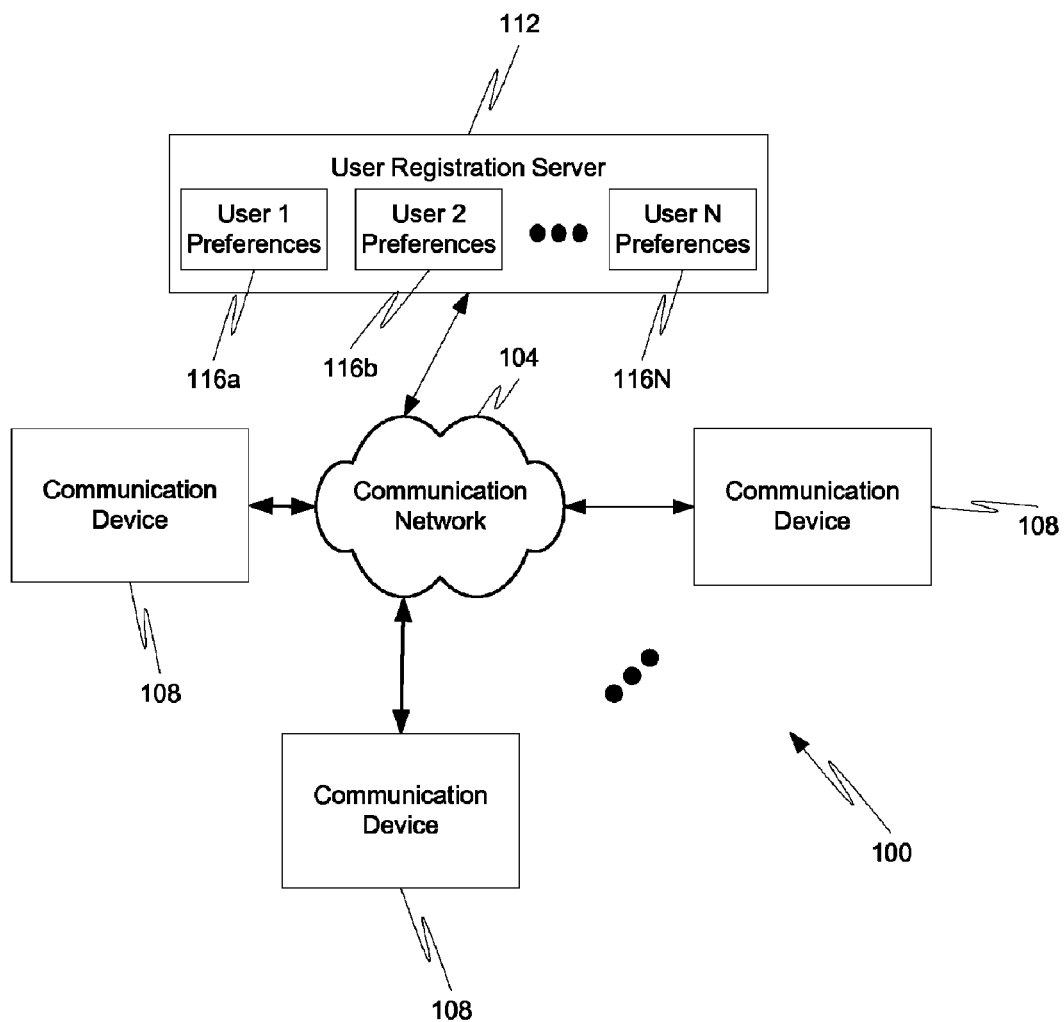
FIG. 1 is block diagram depicting a communication system in accordance with at least some embodiments of the present invention.

With reference initially to FIG. 1, an exemplary communication system 100 will be described in accordance with at least some embodiments of the present invention. More specifically, the communication system 100 includes a communication network 104 adapted to interconnect one or more communication devices 108 with a user registration server 112.

The communication network 104 may be any type of known communication medium or collection of communication mediums and may use any type of protocols to transport messages between endpoints. The communication network 104 may include wired and/or wireless communication technologies. The Internet is an example of the communication network 104 that constitutes and IP network consisting of many computers and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, any type of enterprise network, and any other type of packet-switched or circuit-switched network known in the art. In addition, it can be appreciated that the communication network 104 need not be limited to any one network type, and instead may be comprised of a number of different networks and/or network types.

The communication devices 108 may be any type of known communication or processing device such as a personal computer, laptop, Personal Digital Assistant (PDA), cellular phone, smart phone, telephone, analog phone, DCP phone, or combinations thereof. A single communication device 108 may be controlled by or be associated with a single user or may be adapted for use by many users (e.g., an enterprise communication device that allows any enterprise user to utilize the communication device upon presentation of a valid user name and password).

Each of the communication devices 108 may be associated with the same user. In other words, the communication devices 108 may belong to a single user and may correspond to different types of communication devices. As one example, the user may have four communication devices 108 each of which correspond to a personal phone, a work phone, a personal computer, and an email retrieval device, respectively, of a single user. Alternatively, each of the communication devices 108 may be owned and operated by (e.g., associated with) a different user.

In general, the communication device 108 may be adapted to support video, audio, text, and/or data communications with other communication devices 108. The type of medium used by the communication device 108 to communicate with other communication devices 108 may depend upon the communication applications available on the communication device 108.

The user registration server 112 is adapted to receive and store user preferences for multiple users operating one or more communication devices 108. More particularly, a user may be allowed to log in to the user registration server 112 and define certain preferences (i.e., user preferences) that they want to have applied to any communication session in which the user engages. These user preferences may be defined globally for the user (e.g., a single set of user preferences may be applied consistently at any network and to any communication device associated with that user). Alternatively, a user may be allowed to define different user preferences for different networks or use-cases (e.g., a user may have different home preferences and work preferences). A user may also be allowed to define different user preferences for each of their communication devices 108. As an example, a user may define a first set of contact resolution preferences (e.g., a first CRA) for their mobile communication device 108, a second different set of contact resolution preferences (e.g., a second CRA) for their work communication device, and a third different set of contact resolution preferences (e.g., a third CRA) for their home communication device. All of these different user preferences may be stored in connection with a single set of user preferences 116 on the user registration server 112. For example, it may be useful to chain or form a similar hierarchy of CRAs where, for example, some subset of devices for the user are handled using parallel forking and others are handled using sequential forking. In such an embodiment, there may be some higher level coordinator handling the chaining between CRAs. Also, on a per-device basis, the algorithm could be sensitive to things like time of day, day of week, state of the device, etc. to alter the contact resolution behavior specific for a device.

Alternatively, a single set of contact resolution preferences (i.e., a single CRA) may be used to resolve contacts for the user between all of the communication devices 108 associated with that user. In other words, a single CRA may be employed to determine whether a particular communication device 108 should be alerted, when a particular communication device 108 should be alerted, and how a particular communication device 108 should be alerted. Examples of such CRAs that may be employed in accordance with at least some embodiments of the present invention are described in further detail in U.S. patent application Ser. No. 12/241,368 to Brunson et al., the entire contents of which are hereby incorporated herein by reference.

In accordance with at least some embodiments of the present invention, a user may be allowed to update and/or change their user preferences 116 at the user registration server 112 via their communication device 108. In other words, a user may connect with the user registration server 112 to provision their user preferences 116, usually via some sort of web user options interface. In accordance with at least some embodiments of the present invention, a pluggable CRA may be adapted to support a web options interface for users to set their user preferences 116. These user options may be stored in a local data storage facility, such as an enterprise database, and/or as user preferences 116 in the user registration server 112. These preferences 116 may then be distributed to one or more network devices which will invoke the user's preferences 116 during the contact resolution phase of call processing.

In accordance with at least some embodiments of the present invention, the user preferences 116 include parameters defining a preferred CRA (for one or multiple communication devices 108). When a user updates their user preferences 116, the changes in user preferences may be distributed throughout a network to any device that will apply such preferences. There are typically a very small number of devices in the network (e.g., two or three) that actually need to know a user's CRA choice. However, embodiments of the present invention are not so limited and the changes in user preferences 116 may be distributed to any number of network devices. These preferences may be stored in a user-provisioned table as will be discussed in further detail herein.

Embodiments of the present invention contemplate situations where a new CRA may be deployed in a network while the network is running without adversely affecting the operation of the network (i.e., the administrator can add a hot pluggable CRA to the network in the form of an extension module). In other words, a network administrator is allowed to add new CRAs to a network or a single network device which can be applied by that device to subsequently received contacts. In accordance with at least some embodiments of the present invention, when such a CRA is added to the network, one or more users in the network may be notified of the update. In response to this notification the user may be allowed to alter their user preferences 116 (either directly by responding to the notification or indirectly by separately accessing the user registration server 112) to apply the newly added CRA. Again, the user may be allowed to access and update their user preferences 116 via any type of known or yet to be developed web options interface. Details of such a process will be discussed in further detail below.

As an alternative, or in addition, to allowing a user to update their user preferences 116, a network administrator may also be allowed to update user preferences 116. Accordingly, the alteration of user preferences 116 to invoke a newly added CRA may be executed by the user and/or a network administrator.

Furthermore, the user preferences 116 may be write-secured with a password or similar type of authentication credential. Thus, as an example, without providing the appropriate password as user name a user or administrator may not be allowed to alter user preferences 116. Other alternatives limiting a user and/or administrator's ability to update the user preferences 116 are also envisioned and may vary depending upon network security requirements.

Figure 2:
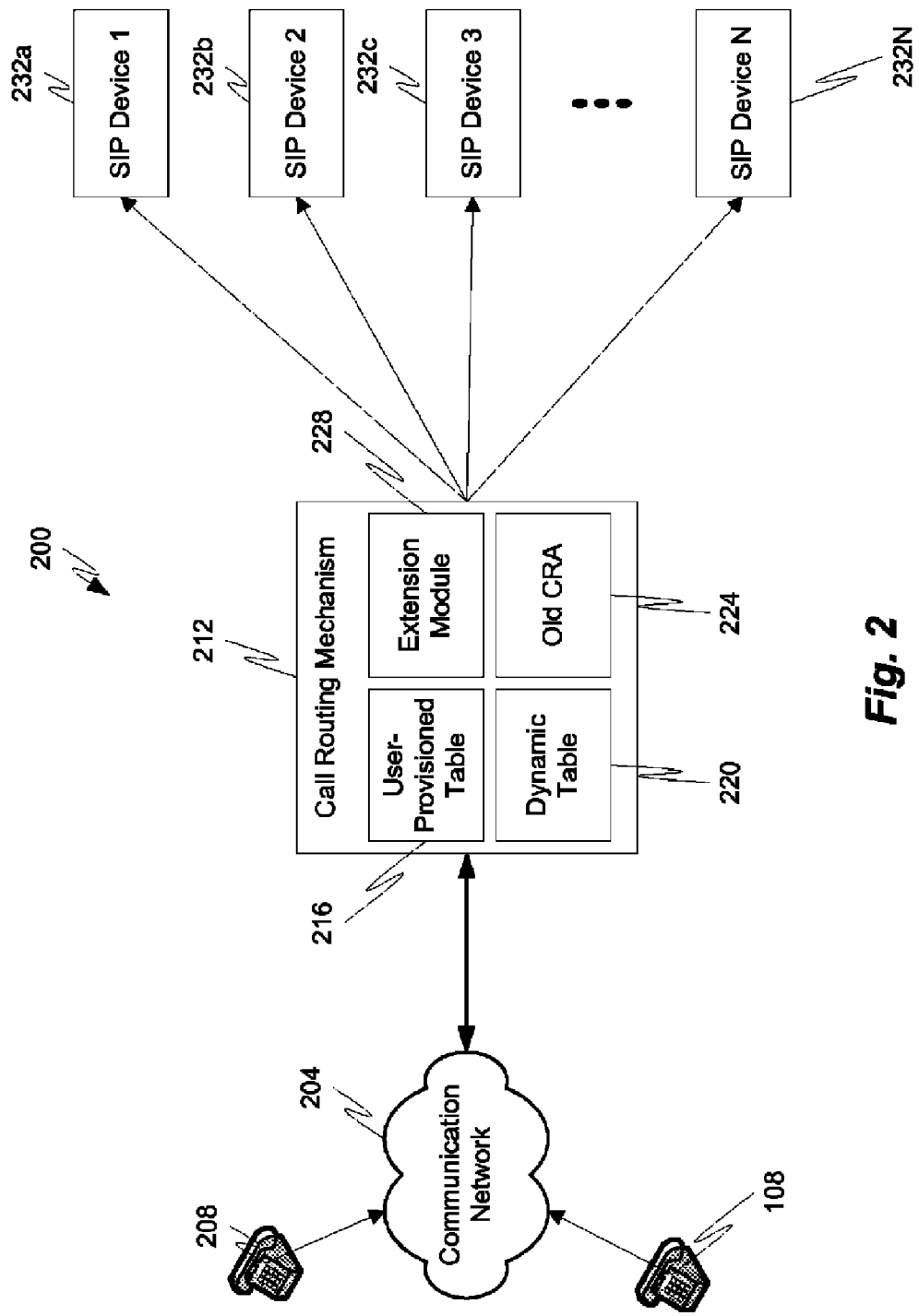
FIG. 2 is a block diagram depicting elements of a contact resolution system in accordance with at least some embodiments of the present invention.

With reference now to FIG. 2, an exemplary SIP communication system 200 will be described in accordance with at least some embodiments of the present invention. The system 200 may include a communication network 204 connecting one or more calling devices 208 (which may or may not correspond to a user's communication device 108) with a call routing mechanism 212.

The communication network 204 may be the same as the communication network 104 or may be different. For example, both networks 104, 204 may correspond to an enterprise network. Alternatively, the communication network 104 may correspond to the Internet whereas the communication network 204 corresponds to an enterprise network or a SIP-enabled network.

Regardless of the configuration of the communication network 204, a caller is allowed to initiate a contact via a calling device to a callee. In accordance with at least some of the embodiments of the present invention, the callee may correspond to a SIP user that has multiple SIP devices 232*a*-N associated therewith. As can be appreciated by one skilled in the art, one or more of the SIP devices 232*a*-N may also correspond to one of the user's communication devices 108 depicted in FIG. 1.

When a caller initiates a contact that is directed toward the callee, a contact resolution request is sent to a call routing mechanism 212, such as a location server, that is adapted to perform contact resolution based on the callee's contact resolution preferences. The callee's preferences may be defined in a user-provisioned table 216, which may or may not be the same as the callee's user preferences 116. Accordingly, the call routing mechanism 212 may be the same as the user registration server 112. Alternatively, updates to user preferences 116 at the user registration server 112 may be forwarded to the call routing mechanism 212 where they are incorporated in the user-provisioned table 216. In accordance with at least some embodiments of the present invention, the user-provisioned table 216 includes a listing of user AORs that are mapped to each user's contact resolution preferences. These preferences may include a pointer that identifies a particular CRA that will be applied to incoming contacts addressed to that user.

Accordingly, in addition to comprising a user-provisioned table 216, the call routing mechanism 212 may further comprise a dynamic table 220, one or more old CRAs 224, and one or more extension modules 228 (or new CRAs). The old CRAs 224 comprise any type of CRA that was residing on the call routing mechanism 212 prior to an upgrade of the call routing mechanism 212 (i.e., prior to deployment of an extension module 228 on the call routing mechanism 212).

The extension module 228 may comprise a new CRA that can be applied by any user if that user updates the user-provisioned table 216 to point to and invoke the extension module. More specifically, when the extension module 228 is deployed it may be assigned a unique ID. If a user desires to employ the CRA associated with the extension module 228, then the user updates their information in the user-provisioned table 216 to include the unique ID of the extension module. Therefore, when a contact resolution request for a contact addressed to the user is received at the call routing mechanism 212, the call routing mechanism 212 is capable of referencing the user-provisioned table 216, determining that the user wants to invoke the CRA of the extension module 228 rather than an old CRA 224, and then use the extension module 228 to process the received contact resolution request.

During processing, the CRA of the extension module 228 may need to determine which SIP devices 232 are eligible to have the contact routed thereto. This determination may be based on whether or not the user has registered a particular SIP device 232 with the call routing mechanism 212. In other words, some contact routing decisions may be based on whether or not a SIP device 232 is on and registered with the call routing mechanism 212. This dynamic registration information related to the activity of SIP devices 232 may be stored in the dynamic table 220. Thus, during processing the CRA of the extension module 228 may be adapted to refer to the dynamic table 220 to determine where the contact should be routed.

The information in the dynamic table 220 is not always based on whether a SIP device 232 is registered with the call routing mechanism 212, although it may be based in part on such considerations. Rather, the information in the dynamic table 220 may alter based on detected presence activity of a particular user, time of day, day of week, call processing load, and other dynamic parameters that might be considered by any CRA (i.e., either an old CRA 224 or a new CRA). In accordance with at least some embodiments of the present invention, the information in the dynamic table 220 may be responsive to changes in state of SIP devices 232 (e.g., whether a SIP device 232 is currently involved in a SIP session or not, what type communication medium is currently being used by the SIP device, etc.). These changes may be reported to the call routing mechanism 212 by the SIP device 232 via any type of known signaling or SIP message. As one example, the SIP devices 232 may update their state information with the call routing mechanism 212 by sending a NOTIFY or PUBLISH message to the call routing mechanism 212.

Additionally, the dynamic table 220 may be responsive to other parameters such as the presence state of another user or another user's device. Thus, a CRA algorithm for a specific user might contain logic which allows devices of other users to be included in the set of devices that participate in the CRA algorithm as targets for INVITE Requests for the specific user. In other words, a CRA algorithm may decide to alert a second user's device when trying to reach a first different user. As one example, a first user may define their CRA algorithm so as to alert a second user's device between a particular time on a particular day (e.g., to reach me try alerting the second user's work phone between 2 and 3 on Friday). This may be done if the first user knows they will be meeting with the second user at that particular time. Furthermore, such information may be automatically retrieved from a user's electronic schedule that is stored in a calendar application or the like.

Figure 3:
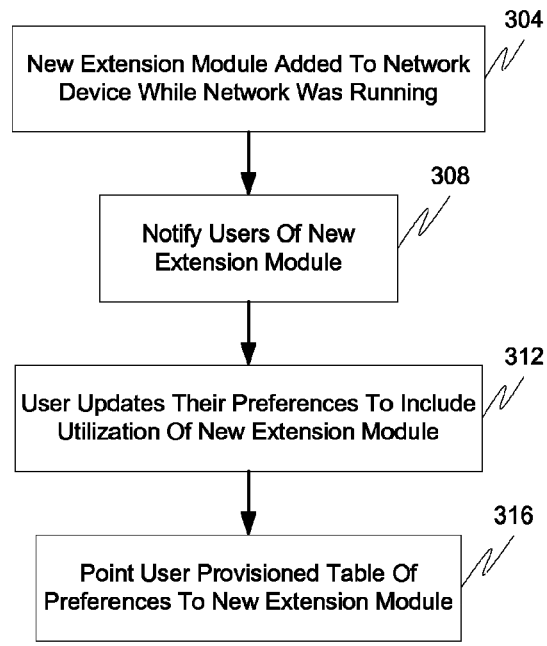
FIG. 3 is a flow diagram depicting a method of allowing a user to define their own contact resolution algorithm(s) in accordance with at least some embodiments of the present invention.

Referring now to FIG. 3, an exemplary method of updating user contact resolution preferences will be described in accordance with at least some embodiments of the present invention. The method is initiated when a new extension module 228 is deployed on a network device, such as a call routing mechanism 212 (step 304). In accordance with at least some embodiments of the present invention, the extension module 228 is hot deployable, which means that the code of the extension module 228 can be added to the network device while the network device is running and while the network device is connected to other network devices. Accordingly, no device downtime is required to deploy an extension module 228 on the network device. This is particularly useful in very large networks because if deployment of a new CRA required network downtime, either the entire network operation could be adversely affected by the downtime of one network device or it would take a very long time to update all network devices, thereby extending the amount of network downtime and increasing productivity losses. Embodiments of the present invention avoid such negative effects. As can be appreciated by one skilled in the art, the deployment of a new CRA is usually executed by a network administrator, but may also be executed by a non-administrative user.

The method continues by notifying one or more users of the newly deployed extension module 228 (step 308). This notification may occur automatically by virtue of the fact that the new extension module 228 was deployed. Alternatively, the notification may be initiated by a network administrator after the new extension module 228 is deployed. Furthermore, the extent of user notification (i.e., the number of users notified of the update) may vary depending upon network security concerns, whether or not the users have subscribed to receive such notifications, and the like. Furthermore, the notifications may come in an electronic format (e.g., via email, SMS message, Instant Message (IM), etc.) or may come in a paper format.

Upon receiving notification that a new extension module 228 has been deployed, a user may then update their preferences 116 to include utilization of the newly deployed extension module 228, and particularly the CRA of the new extension module 228 (step 312). This update may be initiated by responding directly to the notification or the user may update their preferences 116 by separately communicating with the user registration server 112 via a web options interface.

Updating the user preferences 116 causes the user-provisioned table 216 in the call routing mechanism 212 to also be updated (step 316). More specifically, when a user updates their contact resolution preferences, an entry in the user-provisioned table 216 for that particular user is also updated to reflect the new preferences. Even more specifically, the entry in the user-provisioned table may include an identifier of the newly added extension module 228. This identifier may be automatically entered in the table 216 if the user responded directly to the notification or the user may be required to enter the identifier manually when updating their user preferences 116. Once the user-provisioned table 216 has been updated any subsequently received contact addressed to that user will invoke the newly added extension module 228.

As can be appreciated by one skilled in the art, steps 312 and 316 may be combined into a single step, particularly if the user updates the user-provisioned table 216 directly rather than going through an intermediary user registration server 112. However, in larger networks having many call routing mechanisms 212, it may be desirable to have a single registration server 112 as a single point of update for a user. In such a configuration the single registration server 112 may act as the interface with users regarding their preferences and then the registration server 112 may notify the other call routing mechanisms 212 in the network of any changes to a user's preferences.

Figure 4:
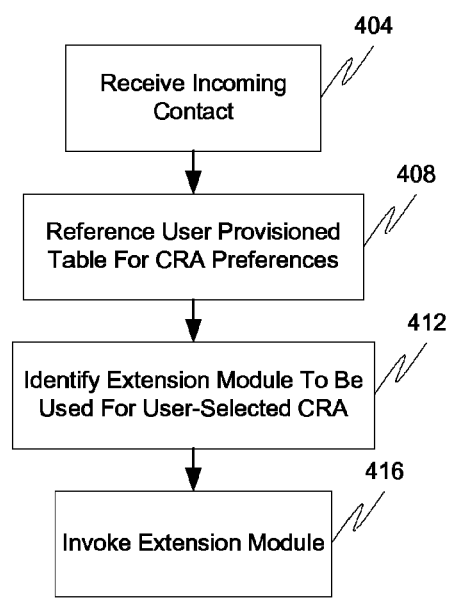
FIG. 4 is a flow diagram depicting a contact resolution method in accordance with at least some embodiments of the present invention.

With reference now to FIG. 4, an exemplary method of processing an incoming contact resolution request will be described in accordance with at least some embodiments of the present invention. The method begins when a contact resolution request is received at the call routing mechanism 212 (step 404). The contact resolution request may include an identifier of the callee. This information may be contained within one or more headers of the contact resolution request. Particularly where the contact resolution request is associated with a SIP INVITE message, the message and the contact resolution request may comprise the identification of the callee via an AOR in a SIP header. As can be appreciated, however, the incoming contact resolution request does not necessarily need to be in the form of a SIP message. Rather, the incoming contact resolution request may correspond to a regular inbound call placed by an analog phone or the like that is identifying a particular communication device rather than a particular user by the user's AOR. The call routing mechanism 212 may alternatively determine that the inbound contact resolution request is for a particular user by virtue of the fact that one of the user's communication devices has been identified by the contact and that identification information has been included in the contact resolution request.

Upon identifying the callee, the method continues with the call routing mechanism 212 referencing the user-provisioned table 216 to identify the contact resolution preferences for the user (step 408). More specifically, the call routing mechanism 212 is adapted to identify the AOR of the user in the table 216 and determine which CRA is to be invoked for that user (step 412). The CRA may be identified by a unique ID that is associated with the CRA. In accordance with at least some embodiments of the present invention, the identified CRA may correspond to a CRA that was newly added to the call routing mechanism 212 via an extension module 228.

Upon obtaining the identifier of the CRA (or more particularly the unique ID of the extension module 228), the call routing mechanism 212 invokes the identified CRA and passes the contact to that CRA (step 416). Once the CRA receives the contact the CRA will refer to the dynamic table 220 (if necessary) to determine which SIP device(s) 232 are eligible to have a contact routed thereto and how to alert such device(s) of the contact. The eligibility of a SIP device 232 may depend on the rules defined in the CRA being invoked as well as whether or not the SIP device 232 is registered with the call routing mechanism 212. The rules of the CRA may define that one SIP device 232 is initially alerted and if the user does not answer the contact at that SIP device 232, then another SIP device 232 may be alerted (serial forking). Alternatively, the rules of the CRA may define that two or more of the SIP devices 232 should be alerted at the same time and the device which responds to the alerting first will win the contact (parallel forking). Other types of CRAs may also be included in the extension module 228 and embodiments of the present invention are not necessarily limited to the CRA examples discussed herein.

While the above-described flowcharts have been discussed in relation to a particular sequence of events, it should be appreciated that changes to this sequence can occur without materially effecting the operation of the invention. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The systems, methods and protocols of this invention can be implemented on a special purpose computer in addition to or in place of the described communication equipment, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a server, personal computer, any comparable means, or the like. In general, any device capable of implementing a state machine that is in turn capable of implementing the methodology illustrated herein can be used to implement the various communication methods, protocols and techniques according to this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The analysis systems, methods and protocols illustrated herein can be readily implemented in hardware and/or software using any known or later developed systems or structures, devices and/or software by those of ordinary skill in the applicable art from the functional description provided herein and with a general basic knowledge of the communication and computer arts.

Moreover, the disclosed methods may be readily implemented in software that can be stored on a storage medium, executed on a programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications device or system.

It is therefore apparent that there has been provided, in accordance with embodiments of the present invention, systems, apparatuses and methods for creating and using pluggable contact resolution algorithms. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

What is claimed is:

1. A method, comprising:
   receiving, at a first server, a contact resolution request for a first user;
   mapping the first user to a first extension module identified by a first unique identifier, the first extension module exposing contact resolution services selected for the first user, the first extension module further comprising an Application Programming Interface (API) that facilitates retrieval of the first extension module, when required, via the first unique identifier; and
   invoking, by the first server, the first extension module which applies a contact resolution algorithm selected for the first user.

2. The method of claim 1, further comprising, determining contact resolution preferences for the first user and wherein the contact resolution preferences for the first user are identified in a user provisioned contact resolution table stored on the first server.

3. The method of claim 2, wherein the contact resolution table comprises data that is user-centric that can be configured and re-configured by the first user via a user options interface.

4. The method of claim 2, further comprising:
   registering a first SIP device with the first server, wherein the first SIP device is associated with the first user;
   updating a dynamic table to indicate that the first SIP device has been registered with the first server;
   registering a second SIP device with the first server, wherein the second SIP device is also associated with the first user; and
   updating the dynamic table to indicate that the second SIP device has been registered with the first server, wherein the first extension module references the dynamic table during processing of the contact resolution request to determine whether to alert one or more of the first and second SIP devices during contact resolution.

5. The method of claim 2, wherein the user provisioned table comprises a mapping between an Address of Record for the first user and the first user's contact resolution preferences.

6. The method of claim 1, wherein invoking the first extension module comprises determining the unique identifier associated with the first extension module and referencing the first extension module with the determined identifier.

7. The method of claim 1, wherein the first extension module is hot deployable.

8. The method of claim 7, further comprising:
   while the first server is running and connected to a communication network, deploying the first extension module on the first server, wherein the first server did not have the first extension module thereon prior to deployment;
   notifying the first user of the deployment of the first extension module via at least one of email, Short Message Service (SMS) message, and Instant Message (IM);
   receiving a response to the notification from the first user; and based on the response received from the first user, determining that the first user has changed their contact resolution preferences from utilizing an old contact resolution algorithm to utilizing a new contact resolution algorithm via the first extension module.

9. The method of claim 1, wherein the first extension module determines one or more of the following: (i) whether to ring a SIP device of the first user; (ii) when to ring a SIP device of the first user; (iii) how to ring a SIP device of the first user; (iv) whether to ring a SIP device of a second user; (v) when to ring a SIP device of the second user; and (vi) how to ring a SIP device of the second user.

10. A non-transitory computer readable medium encoded with a processor executable instructions operable to, when executed, perform the method of claim 1.

11. A server, comprising:
a table including user contact resolution preferences; and
an extension module, wherein the server is adapted to receive a contact resolution request in connection with a contact addressed to a first user and reference the table for the first user's contact resolution preferences and then, based on the first user's contact resolution preferences, invoke the extension module to apply the contact resolution preferences of the first user to the contact resolution request, wherein the extension module exposes contact resolution services and wherein the extension module comprises an Application Programming Interface (API) that facilitates retrieval of the extension module via a unique identifier.

12. The server of claim 11, wherein the table comprises a user-provisioned table having data that is user-centric which can be configured and re-configured by the first user.

13. The server of claim 12, further comprising a dynamic table responsive to registration and de-registration of SIP devices, wherein the server is further adapted to accept a registration from a first SIP device associated with the first user and upon such registration update the dynamic table to include information related to the first SIP device.

14. The server of claim 13, wherein the server is further adapted to accept a registration from a second SIP device associated with the first user and upon such registration update the dynamic table to include information related to the second SIP device and wherein the extension module references the dynamic table during processing of the contact to determine whether to alert one or more of the first and second SIP devices during contact resolution.

15. The server of claim 11, wherein the user provisioned table comprises a mapping between an Address of Record for the first user and the first user's contact resolution preferences.

16. The server of claim 11, wherein the server is further adapted to invoke the extension module by determining the unique identifier associated with the extension module in the table and reference the extension module with the determined unique identifier.

17. The server of claim 11, wherein the extension module is hot deployable.

18. The server of claim 11, wherein the extension module is useable by multiple users.

19. The server of claim 11, wherein while the first server is running and connected to a communication network the first server is adapted to have the extension module deployed thereon and wherein the first server did not have the extension module thereon prior to deployment.

20. The server of claim 11, wherein the extension module is adapted to determine one or more of the following: (i) whether to ring a SIP device of the first user; (ii) when to ring a SIP device of the first user; (iii) how to ring a SIP device of the first user; (iv) whether to ring a SIP device of a second user; (v) when to ring a SIP device of the second user; and (vi) how to ring a SIP device of the second user.

* * * * *

UNITED STATES PATENT AND TRADEMARK OFFICE
CERTIFICATE OF CORRECTION

| | | |
|---|---|---|
| PATENT NO. | : 8,032,624 B2 | |
| APPLICATION NO. | : 12/488277 | |
| DATED | : October 4, 2011 | |
| INVENTOR(S) | : Gordon R. Brunson, Tibor Lukac and Chandra M. Ravipati | |

It is certified that error appears in the above-identified patent and that said Letters Patent is hereby corrected as shown below:

Claim 2, Column 12, line 26, after "user" insert --,--.

Signed and Sealed this
Eleventh Day of September, 2012

David J. Kappos
*Director of the United States Patent and Trademark Office*